(12) United States Patent
Jackson

(10) Patent No.: US 8,357,461 B1
(45) Date of Patent: Jan. 22, 2013

(54) EARTH ELECTROMOTIVE FORCE GENERATION METHOD AND APPARATUS

(76) Inventor: John R. Jackson, Littleton, CO (US)

( * ) Notice: Subject to any disclaimer, the term of this patent is extended or adjusted under 35 U.S.C. 154(b) by 595 days.

(21) Appl. No.: 12/618,506

(22) Filed: Nov. 13, 2009

Related U.S. Application Data

(60) Provisional application No. 61/114,178, filed on Nov. 13, 2008.

(51) Int. Cl.
*H01M 14/00* (2006.01)
*H01M 2/00* (2006.01)
*H01M 10/44* (2006.01)

(52) U.S. Cl. .................. 429/47; 429/7; 429/50

(58) Field of Classification Search ........... 429/7, 9, 429/47, 50, 61, 67, 68, 90, 121, 122, 123, 429/149
See application file for complete search history.

(56) References Cited

U.S. PATENT DOCUMENTS

| | | | |
|---|---|---|---|
| 160,152 A | 2/1875 | Bryan | |
| 495,582 A | 4/1893 | Emme | |
| 3,288,648 A * | 11/1966 | Jones | 429/442 |
| 4,457,988 A * | 7/1984 | Ryeczek | 429/47 |
| 5,605,715 A * | 2/1997 | Giardina et al. | 156/151 |
| 5,681,662 A * | 10/1997 | Chen et al. | 428/607 |
| 5,797,452 A * | 8/1998 | Martin | 166/110 |
| 2006/0240297 A1* | 10/2006 | Takeda et al. | 429/22 |

* cited by examiner

*Primary Examiner* — Philip Tucker
*Assistant Examiner* — Brian R Slawski
(74) *Attorney, Agent, or Firm* — Leyendecker and Lemire LLC; Kurt Leyendecker

(57) ABSTRACT

A method and apparatus for producing electricity using Earth electromotive force is disclosed herein. The method comprises placing a first electrode into a first section of the Earth, typically a hydrocarbon bearing formation. Next, a second electrode is placed into a second section of the Earth, typically in or proximal a water zone. Further, the first and second electrodes are electrically coupling to a boost converter assembly. The boost converter assembly is adapted to convert an input voltage derived from the first and second electrodes to an output voltage higher than the input voltage. An apparatus and electrical system comprising the various components for harvesting Earth energy are further disclosed.

20 Claims, 4 Drawing Sheets

EARTH ELECTROMOTIVE FORCE GENERATION METHOD AND APPARATUS

CROSS-REFERENCE TO RELATED APPLICATIONS

This application claims priority to U.S. Provisional Patent Application No. 61/114,178 filed Nov. 13, 2008, the full disclosure of which is incorporated herein by reference. The aforementioned provisional patent application has the title "Earth Electromotive Generator Apparatus and Method Based Upon Natural Earth Currents," and has the same named inventor as the present application.

FIELD OF THE INVENTION

The present invention relates generally to harvesting energy from the Earth and producing electricity therefrom. More particularly, the present invention relates to providing electricity from electromotive force of the Earth.

BACKGROUND

New energy sources are always desired as the world's energy demand continues to rise. Much of the world's energy is produced from extracting oil and gas from hydrocarbon bearing formations contained within the Earth's strata. Hydrocarbons in the form of oil and gas are usually extracted by drilling wells into these hydrocarbon bearing formations subsurface deep into the Earth's strata.

Often energy producing hydrocarbons remain trapped inside hydrocarbon bearing formations after drilling and practical methods of extraction have been exhausted. These hydrocarbons can provide a source of electrons for use in alternative energy methods. Moreover, in many modern extraction efforts, hundreds of deep wells and steel or metallic casings remain after extraction of the oil and gas has been completed thereby providing access to the hydrocarbon bearing formations.

Certain types of Earth batteries are generally known in the prior art, but lack a means to provide electricity for commercial purposes. Other means of harvesting Earth energy are not know in the prior art. Heretofore, there is a need in the art to improve methods and apparatus to provide a commercially viable energy source from Earth electromotive force generation.

DETAILED DESCRIPTION

Figure 1:
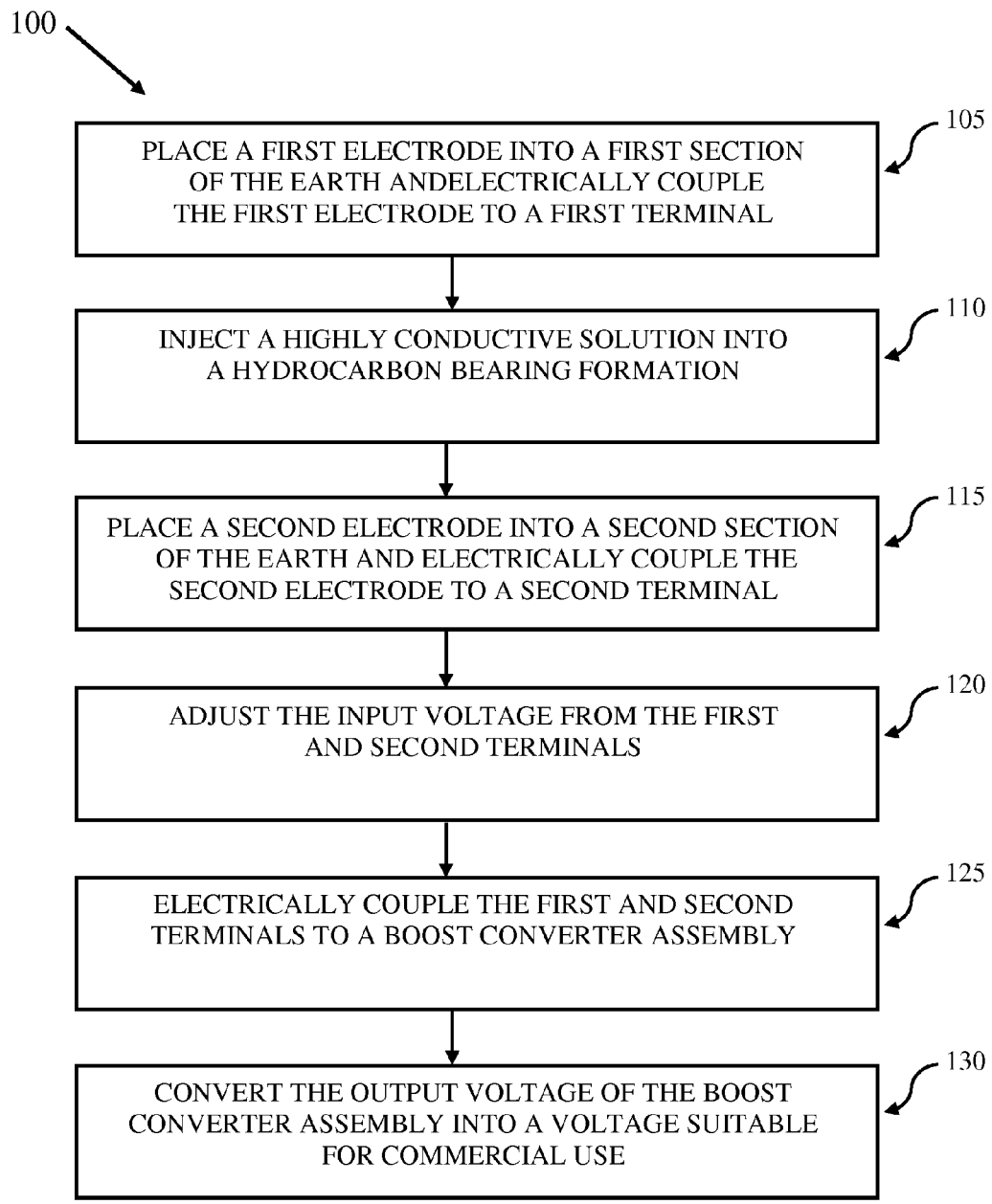
FIG. 1 is a flow chart describing an exemplary method of the invention for producing electricity from Earth electromotive force according to an embodiment of the invention

Embodiments of the method and apparatus for providing electricity using Earth electromotive force comprise placing electrodes within sections of the Earth's strata to take advantages of discontinuities therein and boosting the small voltage potential between the electrodes. Embodiments include using discontinuities between two sections of the Earth's strata such as, but are not limited to, (i) a hydrocarbon bearing formation (ii) a water zone, (iii) a geothermal brine formation, (iv) a geothermal hot water formation, (v) a geothermal steam formation, (vi) a basaltic dyke, and (vii) a granite formation.

By extending the electrodes with low resistance conductors to two of the aforementioned sections of the Earth's strata, the discontinuities resulting from redox (reduction-oxidation) chemical reactions creating variations in current and ion flow within the Earth's strata can create a small voltage potential between the two electrodes. With modern boost circuitry, the small voltage potential between the electrodes can then be boosted, converted, and aggregated to provide a voltage source suitable for commercial use.

An exemplary embodiment comprises placing a first electrode into a hydrocarbon bearing formation and a second electrode proximal or directly in a water zone. The first and second electrodes are electrically coupled to a first and second terminal. The first and second terminals are likewise electrically coupled to a boost converter assembly. The boost converter assembly is adapted to convert an input voltage from the first and second terminals into an output voltage higher than the input voltage.

Typically, the first electrode is placed deep below the Earth's surface through the overburden to reach the hydrocarbon bearing formation. Hence, an elongated conductor may be required to allow the first electrode to reach the hydrocarbon bearing formation. In some embodiments, a highly conductive fluid is injected into the hydrocarbon bearing formation. Moreover, when a plurality of first and second electrodes are placed throughout sections of the Earth's strata with discontinuities therein, the power output of the energy source harvested from the Earth can be greatly increased.

Terminology

The terms and phrases as indicated in quotation marks (" ") in this section are intended to have the meaning ascribed to them in this Terminology section, applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning "either or both."

References in the specification to: "one embodiment"; "an embodiment"; "another embodiment"; "an alternative embodiment"; "one variation"; "a variation"; and similar phrases mean that a particular feature, structure, or characteristic described in connection with the embodiment or variation, is included in at least an embodiment or variation of the invention. The phrase "in one embodiment," "in one variation," or similar phrases, as used in various places in the specification, are not necessarily meant to refer to the same embodiment or the same variation.

The term "couple" or "coupled," as used in this specification and the appended claims, refers to either an indirect or direct connection between the identified elements, components or objects. Often the manner of the coupling will be related specifically to the manner in which the two coupled elements interact.

The term "hydrocarbon bearing formation," as used in this specification and the appended claims, refers to any type of formation including one or more hydrocarbon containing layers. Hydrocarbon bearing formations may also contain one or more non-hydrocarbon layers with the one or more hydrocarbon containing layers. The hydrocarbons contained in hydrocarbon bearing formations are typically, but not necessarily, oil and gas.

The term "overburden," as used in this specification and the appended claims, refers to any type of material that lies above a hydrocarbon bearing formation. Non-limiting examples of materials in the overburden include rock and soil.

An Exemplary Method of Providing Electricity using Earth Electromotive Force

FIG. 1 is a flow chart illustrating an exemplary method for producing electricity from Earth electromotive force. Method 100 generally describes producing electricity from Earth electromotive force where discontinuities in the Earth's strata enable redox chemical reactions creating variations in current and ion flow within the Earth's strata. However, some operations will be described according to an exemplary implementation of method 100 where a hydrocarbon formation and a water zone are used as discontinuities within the Earth's strata.

As shown in block 105, a first electrode is placed within a first section of the Earth. The first section of the Earth can, and typically is, a hydrocarbon bearing formation. The hydrocarbon bearing formation is typically subsurface hundreds or thousands of feet below the Earth's surface. Modern drilling techniques can provide bores or wells as deep as 29,000 feet subsurface to reach various hydrocarbon bearing formations. However, a bore or well is more typically in the range of 5,000-8,000 feet below the Earth's surface. The first electrode is electrically coupled to a first terminal (block 105). As can be deduced, electrically coupling the first electrode within a hydrocarbon bearing formation 5,000-8,000 feet below the Earth's surface can present a challenge. An elongated insulated conductor, typically a wire or cable, typically accomplishes the electrical coupling. However, other variations of the elongated insulated conductor are contemplated as will be described later in this specification.

Additionally, when the first electrode is placed into a hydrocarbon bearing formation, a highly conductive solution can be injected into the hydrocarbon bearing formation (block 110). The highly conductive solution can comprise any suitable fluid. Typically, but not necessarily, the solution acts as an electrolyte in which ions made readily flow. In one variation, the highly conductive solution is salt water comprising sulfuring acid. The percentage of sulfuric acid can vary depending on the specific implementation, but is typically between 5-20%. Similarly, the concentration of salt in the water of the highly conductive solution is typically 20% or greater. Moreover, a powder of conductive metal may be added to and suspended in the highly conductive solution. For instance, a powder of zinc can be used to increase oxidation reactions thereby increasing the number of electrons available to the anode.

Next, as shown in block 115, a second electrode is placed within a second section of the Earth. The second section of the Earth can, and typically is, a water zone. The second electrode can be placed in or proximal the water zone. Water zones include, but are not limited to, surface water zone or groundwater zone. Surface water zones include lakes (man-made or natural), rivers and streams, whereas groundwater zones include unconfined and confined aquifers. Moreover, it is often advantageous to electrically couple the second electrode to a metal casing of a shallow well bore, particularly if the metal casing is proximal or within a water zone such as a groundwater zone. Metal casings of the shallow well typically comprise the first section of an oil and gas well from the Earth's surface to a few hundred feet into the overburden.

With both the first and second electrodes properly placed and installed, an input voltage (typically very small at approximately less than 2 Volts) will be present at the first and second terminals. The input voltage can be measured to determine whether it is within a desired operating range. Hence, the input voltage at the first and second terminal can be adjusted (block 120). In some implementations of method 100, it is desirable to adjust the input voltage to approximately 900 mVolts prior for an effective boost converter stage.

The input voltage can be adjusted in any number of ways. For example, the first electrode can be moved up or down in the hydrocarbon bearing formation. In some implementations, the first electrode can be moved horizontally through the hydrogen bearing formation as some wells have horizontal well portions extending approximately 2,000 feet. Additionally, the second electrode can be moved closer or further from the water zone. Moreover, the size of either or both of the first and second electrodes can be increased or decreased. Also, the resistance of the elongated insulated conductor to the first terminal can be increased, but such a modification may not be desirable in some implementations as it would increase power loss prior to the boost converter stage.

Next, as shown in block 125, the first and second terminals are electrically coupled to a boost converter assembly. Essentially, the boost convertor assembly comprises electronic circuitry to boost the unusable low input direct current (DC) voltage, typically lower than 1 Volt, to a more workable or desirable higher DC voltage, typically between 3-5 Volts. Additional DC-DC converters can boost the voltage to an output voltage of approximately 12-15 Volts.

As next described in block 130, the operation of converting the output voltage of the boost converter assembly into a voltage suitable for commercial use is performed. Alternating current (AC) voltage is generally desired for commercial application. Typically, the output voltage is fed into a DC-AC inverter, which converts the approximately 12-15 Volts DC into an suitable AC power source of the required frequency and voltage (e.g., 60 Hertz 110-120 Volts AC).

It is to be appreciated that method 100 and variations thereof can be performed where the first and second section of the Earth are other than a hydrogen bearing formation and a water zone. The first and second sections can be areas of the Earth where discontinuities resulting from redox chemical reactions create variations in current flow between the first and second sections of the Earth such as, but not limited to, a geothermal brine formation, a geothermal hot water formation, a geothermal steam formation, a basaltic dyke, and a granite formation.

Figure 2:
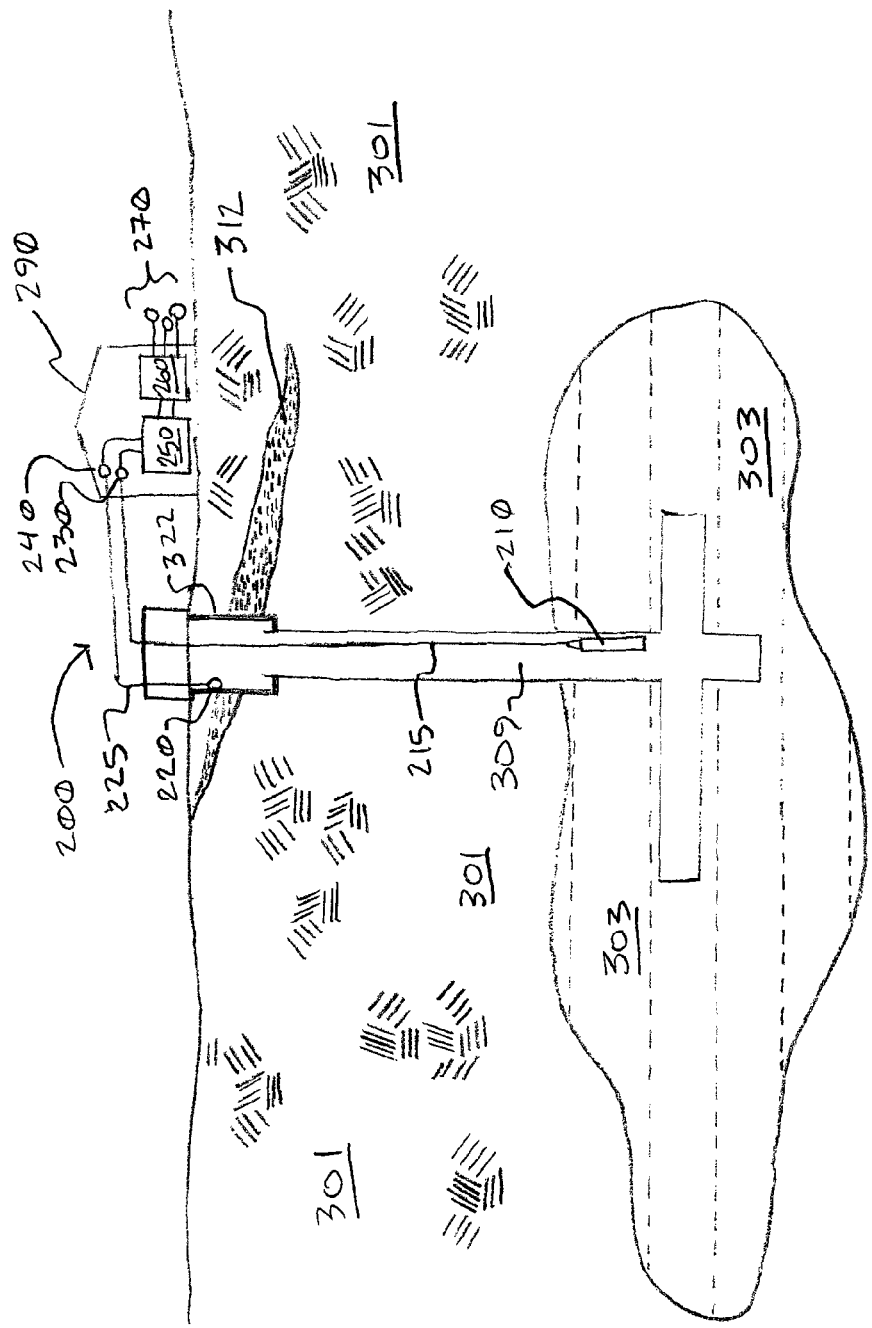
FIG. 2 is a side plan view of an apparatus for producing electricity from Earth electromotive force according to an embodiment of the invention.

Embodiments of an Apparatus for Providing Electricity using Earth Electromotive Force An embodiment of an apparatus for providing electricity using Earth electromotive force is illustrated in FIG. 2. Apparatus 200 comprises a first electrode 210, a first extended conductor 215, a first terminal 230, a second electrode 220, a second conductor 225, a second terminal 240, and a boost converter assembly 250. Apparatus 200 typically also comprises a DC-AC inverter assembly 260 having an AC output 270.

Still referring to FIG. 2, an oil and gas well 309 comprises a metal casing 322 of a shallow well bore at the Earth's surface. The oil and gas well 309 continues through an overburden 301 and into a hydrocarbon bearing formation 303. As illustrated within the hydrocarbon bearing formation 303, the oil and gas well 303 can have horizontal portions. Additionally, a groundwater zone 312 is shown running through a portion of the metal casing 322.

Typically, but not necessarily, the first electrode 210 is an anode in an embodiment. As illustrated, the first electrode 210 is placed within the hydrocarbon bearing formation 303. The hydrocarbons contained within the hydrocarbon bearing formation 303 have an excess supply of electrons. Also as previously described, the highly conductive solution can be added to the hydrocarbon bearing formation 303 to mix with the hydrocarbons thereby increasing conductivity and creating an electrolyte solution. The hydrocarbons are oxidized and lose electrons which are accumulated by the first electrode 210 acting as the anode. The first electrode 210 comprises material adapted to gain electrons such as, but not limited to zinc. Moreover, the first electrode 210 can be an elongated rod, typically metallic, between 1-2 inches in diameter and 50-100 feet long. However, it is to be appreciated that the first electrode can vary substantially between implementations and can comprise a number of different shapes and materials.

The first electrode 210 is connected and electrically coupled to a first extended conductor 215. The first extended conductor 215 is typically insulated and of low resistance. Moreover, the first extended conductor 215 is electrically coupled to the first terminal 230. The first extended conductor 215 can be an insulated wire or cable. However, given the extensive depth of the oil and gas well 309, alternative first extended conductors can be utilized. For example, the first extended conductor 215 can be an elongated non-conductive tube comprising a highly conductive solution therein to establish conductivity between the first electrode 210 and the first terminal 230.

Typically, but not necessarily, the second electrode 220 is a cathode in an embodiment. Still referring to FIG. 2, the second electrode 220 is connected and electrically coupled to the metal casing 322 of the shallow well bore. Further, the metal casing 322 is in contact with a water zone, specifically the groundwater zone 312. Water molecules and materials/chemicals in the overburden 301 in contact with the second electrode 220 can gain electrons (naturally having a lack of electrons) thereby creating a reduction reaction. Hence, the water molecules and materials/chemicals in the overburden 301 adopt electrons from the second electrode 220 acting as a cathode. The second electrode 220 comprises material adapted to lose electrons such as, but not limited to copper. The second electrode 220 is electrically coupled to the second terminal 240 through the second conductor 225. It is pertinent to note that other embodiments comprise utilizing natural Earth currents associated with discontinuities in otherwise homogeneous Earth strata differently than as described above.

Importantly to apparatus 200, the boost converter assembly 250 receives an input voltage from the first and second terminals 230 & 240 and converts the input voltage to an output voltage higher than the input voltage. The electronic circuitry of the boost converter assembly 250 boosts the unusable low voltages from the first and second terminals 230 & 240 to a more workable higher voltage. The low input DC voltage, typically lower than 1 Volt, can be boosted to a more workable higher DC voltage, typically between 3-5 Volts. Additional DC-DC converters can boost the voltage to an output voltage of approximately 12-15 Volts.

Still referring to FIG. 2, the DC-AC inverter assembly 260 receives the DC voltage from the output of the boost converter assembly 250. The DC-AC inverter assembly 260 converts the DC voltage (approximately 12-15 Volts DC) from the output of the boost converter assembly 250 into the AC output 270. The AC output 270 output voltage from the DC-AC inverter assembly 260 comprises a suitable AC power source such as, but not limited to, a 60 Hertz 110-120 Volts AC output. Additionally, the boost converter assembly 250 and DC-AC inverter assembly 260, as well as other electronic components of the apparatus 200 can be contained within a weatherproof but 290 proximal the metal casing 322 of the shallow well bore and oil and gas well 309.

Figure 3:
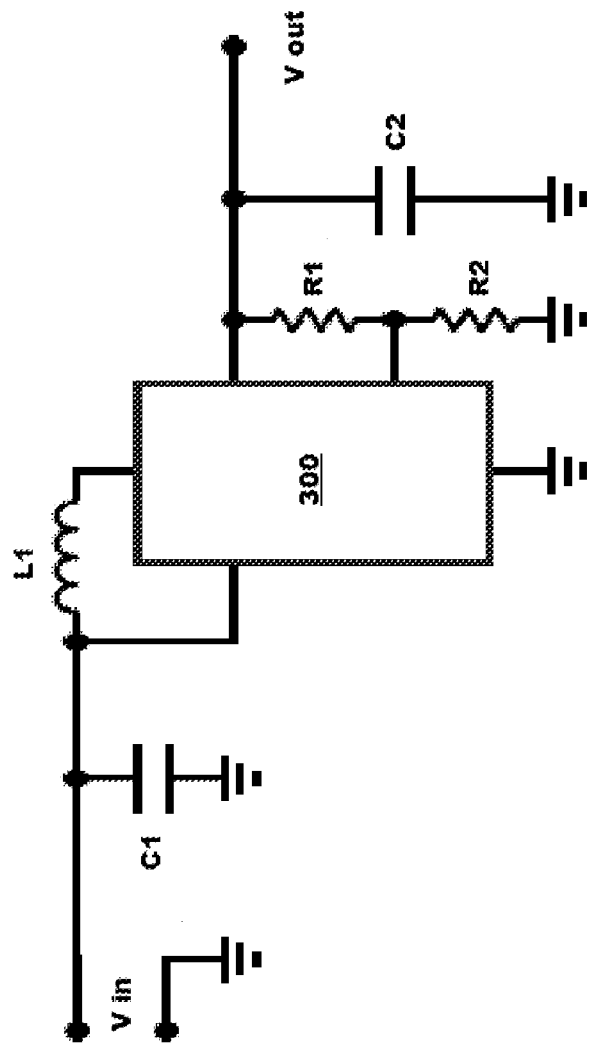
FIG. 3 is a schematic diagram for an exemplary boost converter circuit of an apparatus for producing electricity from Earth electromotive force according to an embodiment of the invention.

FIG. 3 is a schematic diagram for an exemplary boost converter circuit of an apparatus for producing electricity from Earth electromotive force according to an embodiment of the invention. Boost converter circuit comprises terminals for receiving a DC input voltage (V in). Referring momentarily back to FIG. 2, the input voltage from the first and second terminals 230 & 240 may be received by one or more boost converter circuits. In one embodiment, the boost converter circuit (FIG. 3) comprises a first capacitor C1 having a value of 4.7 µF, an first inductor L1 having a value of 4.7 µH, a first resistor having a value of 1.02 Mega Ohms, a second resistor having a value of 604 kilo Ohms, second capacitor having a value of 10 µF, and a DC-DC converter 300. The DC-DC converter 300 is a synchronous, fixed frequency, step-up DC-DC converter contained within an integrated chip. Additionally, the boost converter circuit has a DC output voltage (V out). Again referring momentarily back to FIG. 2, the output voltage and terminals from the boost converter assembly 250 illustrated into DC-AC inverter assembly 260 may be the DC output voltage(s) of one or more boost converter circuits. One or more boost converter circuits in a parallel array along with associated wiring and electrical components comprise an embodiment of the boost converter assembly 250.

It is to be appreciated that the use of the solid state electronics in the one or more boost converter circuits enables the small voltage potential created from discontinuities between the two sections of the Earth's strata to be converted into a voltage suitable for commercial use.

Figure 4:
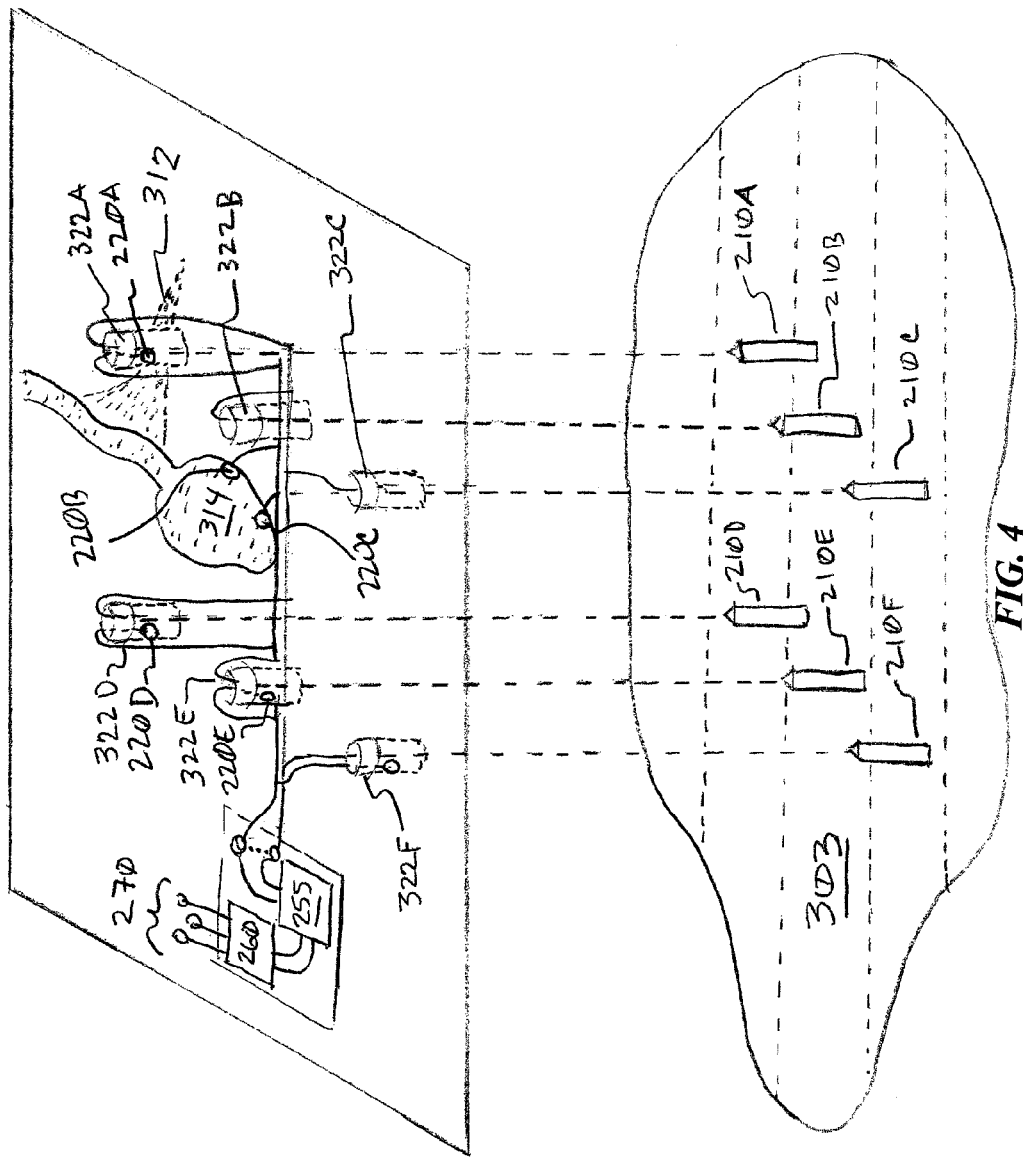
FIG. 4 is an overhead perspective view of a plurality of electrodes from the apparatus creating an electrical system for producing electricity from Earth electromotive force according to an embodiment of the invention.

FIG. 4 is an overhead perspective view of a plurality of electrodes from the apparatus creating an electrical system for producing electricity from Earth electromotive force according to an embodiment of the invention. An embodiment of the electrical system for producing electricity using Earth electromotive force comprises a plurality of first electrodes 210a, 210b, 210c, 210d, 210e, & 210f, a plurality of second electrodes 220a, 220b, 220c, 220d, 220e, & 220f and a multi-circuit boost converter assembly 255.

In one embodiment, each first electrode 210a, 210b, 210c, 210d, 210e, & 210f is an anode and electrically coupled to a negative terminal through an extended conductor adapter to allow each first electrode 210a, 210b, 210c, 210d, 210e, & 210f to be placed within the hydrocarbon bearing formation 303. Each second electrode 220a, 220b, 220c, 220d, 220e, & 220f is a cathode and electrically coupled to a positive terminal through a conductor to various areas. As illustrated, second electrodes 210a, 220d, 220e, & 220f are connected and electrically coupled to their metal casings 322a, 322d, 322e, & 322f some of which are in contact with groundwater zone 312, whereas second electrodes 210b & 210c are placed in a lake 314.

Still referring to FIG. 4, the multi-circuit boost converter assembly 255 is very similar to the aforementioned boost converter assembly except that is adapted to receive each negative terminal from the plurality of first electrodes 210a, 210b, 210c, 210d, 210e, & 210f, and each positive terminal from the plurality of second electrodes 220a, 220b, 220c, 220d, 220e, & 220f into a boost converter circuit (FIG. 3). The multi-circuit boost converter assembly 255 then converts an input voltage from each boost converter circuit to an output voltage higher than the input voltage and combines the output voltage from each boost converter circuit thereby providing a higher power output. Additionally, the output voltage can be converted to the AC output 270 suitable for commercial use by converting it with the DC-AC inverter assembly 260.

It is pertinent to note that may variations of the electrical system exist. For instance, each of the plurality of second electrodes may be coupled to a single metal casing. Moreover, tens or hundreds of first and second electrodes can exist in a large oil field significantly increasing to power source of the electrical systems for producing electricity from Earth electromotive force. For example, using 100 boost converter circuits in the multi-circuit boost converter assembly can produce approximately 50 watts output at 3.3 Volts DC.

Alternate Embodiments and Variations

The various embodiments and variations thereof illustrated in the accompanying figures and/or described above are merely exemplary and are not meant to limit the scope of the invention. It is to be appreciated that numerous variations to the invention have been contemplated as would be obvious to one of ordinary skill in the art with the benefit of this disclosure. All variations of the invention that read upon the appended claims are intended and contemplated to be within the scope of the invention.

For example, the first electrode is typically an anode and the second electrode is typically a cathode of the apparatus. However, in some alternative embodiments, it is contemplated that the apparatus for generating power via Earth electromotive force may be used in a recharging battery configuration whereby the anode would be a positive terminal and the cathode would be a negative terminal. Hence, in such alternative embodiments, the cathode would send current back to an external generator.

I claim:

1. A method for producing electricity using Earth electromotive force, the method comprising:
    placing a first electrode into a first section of the Earth, the first electrode being electrically coupled to a first terminal;
    placing a second electrode into a second section of the Earth, the second electrode being electrically coupled to a second terminal; and
    electrically coupling the first and second terminals to a boost converter assembly, the boost converter assembly adapted to convert an input voltage of approximately 2 volts or less from the first and second terminals to an output voltage of 3 to 5 volts, the boost converter assembly comprising a plurality of boost converter circuits operatively configured in parallel wherein each boost converter circuit comprises a synchronous step-up DC-DC converter contained within an integrated chip.

2. The method of claim 1, wherein the first section of the Earth is a hydrocarbon bearing formation.

3. The method of claim 1, wherein the second section of the Earth is a water zone.

4. The method of claim 2 further comprising,
    injecting a highly conductive solution into the hydrocarbon bearing formation.

5. The method of claim 4, wherein the highly conductive solution comprises salt water and sulfuric acid.

6. The method of claim 4, wherein the highly conductive solution includes a powder of conductive metal.

7. The method of claim 1 further comprising,
    adjusting the input voltage at the first and second terminals.

8. The method of claim 7, wherein said adjusting the input voltage comprises moving the first and second electrodes a distance between each other.

9. The method of claim 7, wherein said adjusting the input voltage comprises adjusting a voltage potential between the first and second electrodes until the voltage potential is approximately 900 mVolts.

10. The method of claim 1, wherein said placing the first electrode comprises lowering the first electrode connected to a low resistance insulated conductor into a man-made bore on the Earth's surface to a distance greater than approximately 5,000 feet, and said placing the second electrode comprises connecting the second electrode to a metal casing of a shallow well bore.

11. The method of claim 1 further comprising,
    converting the output voltage of the boost converter assembly into a standard AC voltage adapted for commercial use.

12. The method of claim 1, wherein the first and second section of the Earth are in areas of the Earth where discontinuities resulting from redox chemical reactions create variations in current flow between the first and second sections of the Earth.

13. An apparatus for producing electricity using Earth electromotive force, the apparatus comprising:
    a first electrode, the first electrode being an anode and installed in a first section of the Earth having an abundance of electrons relative to other parts of the Earth's strata;
    a first extended conductor, the first extended conductor being insulated and electrically coupled to the first electrode;
    a first terminal, the first terminal being electrically coupled to the first extended conductor;
    a second electrode, the second electrode being a cathode and installed in a second section of the Earth having a lack of electrons relative to other parts of the Earth's strata;
    a second terminal, the second terminal being electrically coupled to the second electrode; and
    a boost converter assembly, the boost converter assembly adapted to convert an input voltage of approximately 2 volts or less from the first and second terminals to an output voltage of 3 to 5 volts, the boost converter assembly comprising a plurality of boost converter circuits operatively configured in parallel wherein each boost converter circuit comprises a synchronous step-up DC-DC converter contained within an integrated chip.

14. The apparatus of claim 13, wherein (i) the first section of the Earth is a hydrocarbon bearing formation and (ii) the second section of the Earth is a water source.

15. The apparatus of claim 14, wherein the water source is one of a lake and a groundwater flow area.

16. The apparatus of claim 13, wherein the first electrode is an elongated conductive rod comprising copper and having a diameter between 1 and 2 inches and a length between 50 to 100 feet.

17. The apparatus of claim 13, wherein the first extended conductor is a shielded wire having a length greater than 1,000 feet.

18. The apparatus of claim 13, wherein the first extended conductor is an elongated non-conductive tube comprising a highly conductive solution therein.

19. An electrical system for producing electricity using Earth electromotive force, the electrical system comprising:
    a plurality of first electrodes, each first electrode being an anode and electrically coupled to a negative terminal through an extended conductor adapted to allow each first electrode to be placed within a hydrocarbon bearing formation;

a plurality of second electrodes, each second electrode being a cathode and electrically coupled to a positive terminal through a conductor to a one of (1) a metal casing of a shallow well bore proximal a water zone and (2) a water zone; and a multi-circuit boost converter assembly, the multi-circuit boost converter assembly comprising a plurality of boost converter circuits operatively configured in parallel, the multi-circuit boost converter assembly adapted to receive each negative terminal from the plurality of first electrodes and each positive terminal from the plurality of second electrodes, each boost converter circuit being conductively coupled with each other boost converter circuit in parallel and adapted to-convert an input voltage to an output voltage higher than the input voltage, each boost converter circuit comprising a synchronous step-up DC-DC converter contained within an integrated chip.

20. The electrical system of claim 19, wherein the multi-circuit boost converter assembly further comprises, a DC-DC converter assembly, the DC-DC converter assembly adapted to receive the higher power output from multi-circuit boost converter assembly and boost the output voltage to approximately 12 to 15 Volts, and a DC-AC inverter assembly, DC-AC inverter assembly adapted to receive the output voltage to approximately 12 to 15 Volts from the DC-DC inverter assembly and convert the output voltage to a standard 120 Volts AC output.

\* \* \* \* \*